United States Patent
Zhao

(10) Patent No.: US 11,761,779 B2
(45) Date of Patent: Sep. 19, 2023

(54) NAVIGATION METHOD

(71) Applicant: Shenzhen Next Generation Communications Limited, Shenzhen (CN)

(72) Inventor: Ri-Wen Zhao, Shenzhen (CN)

(73) Assignee: Mobile Drive Netherlands B.V., Amsterdam (NL)

( * ) Notice: Subject to any disclaimer, the term of this patent is extended or adjusted under 35 U.S.C. 154(b) by 276 days.

(21) Appl. No.: 17/121,584

(22) Filed: Dec. 14, 2020

(65) Prior Publication Data

US 2021/0199459 A1 Jul. 1, 2021

(30) Foreign Application Priority Data

Dec. 27, 2019 (CN) .......................... 201911377522.2
Dec. 27, 2019 (CN) .......................... 201911377552.3

(51) Int. Cl.
  *G01C 21/36* (2006.01)
  *H04W 4/029* (2018.01)
  *G06F 16/9035* (2019.01)

(52) U.S. Cl.
  CPC ..... *G01C 21/3638* (2013.01); *G01C 21/3605* (2013.01); *G06F 16/9035* (2019.01); *H04W 4/029* (2018.02)

(58) Field of Classification Search
  CPC .......... G01C 21/3638; G01C 21/3605; H04W 4/029; G06F 16/9035
  See application file for complete search history.

(56) References Cited

U.S. PATENT DOCUMENTS

| | | | |
|---|---|---|---|
| 7,817,033 B2 | 10/2010 | Motoyama | |
| 7,877,204 B2 | 1/2011 | Sprigg | |
| 2016/0097651 A1* | 4/2016 | Jung | G08G 1/0969 701/428 |
| 2018/0077712 A1* | 3/2018 | Carnevale | H04L 67/04 |
| 2020/0408531 A1* | 12/2020 | Leary | G08G 1/202 |

FOREIGN PATENT DOCUMENTS

| | | | | |
|---|---|---|---|---|
| CN | 103900595 A | * | 7/2014 | ......... G01C 21/3423 |
| CN | 107885738 A | * | 4/2018 | .......... G06F 16/235 |
| CN | 108749767 A | * | 11/2018 | |
| CN | 109298904 B | * | 7/2019 | ......... G06F 17/2775 |
| CN | 110068349 A | | 7/2019 | |
| KR | 20130143327 A | * | 6/2012 | |
| TW | 201122438 | | 7/2011 | |

OTHER PUBLICATIONS

English translation of CN-107885738-A.*
English translation of KR 20130143327 A.*
English translation of CN-108749767-A.*
English translation of CN-109298904-B.*
English translation of CN-103900595-A.*

* cited by examiner

*Primary Examiner* — Anshul Sood
*Assistant Examiner* — Matthew Ho
(74) *Attorney, Agent, or Firm* — ScienBiziP, P.C.

(57) ABSTRACT

A navigation method is provided. The method includes obtaining a navigation destination of a first navigation application of a mobile terminal. Once the navigation destination is sent from the mobile terminal to a vehicle-mounted device, a second navigation application of the vehicle-mounted device is controlled to navigate based on the navigation destination.

5 Claims, 7 Drawing Sheets

NAVIGATION METHOD

CROSS-REFERENCE TO RELATED APPLICATIONS

This application claims priority to Chinese Patent Application No. 201911377552.3 filed on Dec. 27, 2019, and claims priority to Chinese Patent Application No. 201911377522.2 filed on Dec. 27, 2019, the contents of which are incorporated by reference herein.

FIELD

The present disclosure relates to navigation technology, in particular to a navigation method.

BACKGROUND

Navigation is often used in daily life. In the process of implementing the present disclosure, the inventor found that the content of navigation between a navigation application of a vehicle and a navigation application of a mobile phone could not be synchronized with each other, which may not be optimal for users.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
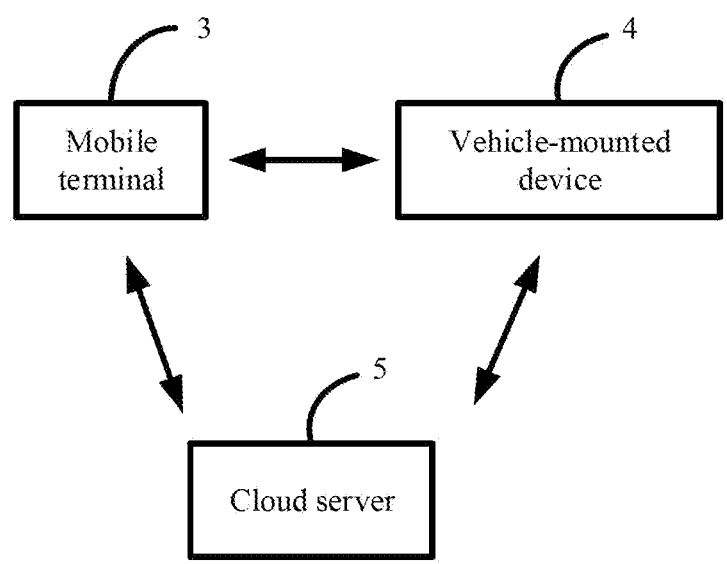
FIG. 1 shows one embodiment of a navigation system of the present disclosure.

FIG. 1 shows a block diagram of a navigation system provided by a preferred embodiment of the present disclosure.

The navigation system of the present disclosure includes a mobile terminal 3, a vehicle-mounted device 4, and a cloud server 5. In an embodiment, the mobile terminal 3 and the vehicle-mounted device 4 may establish a communication connection through a short-distance communication method (for example, a BLUETOOTH communication method). The mobile terminal 3 and the vehicle-mounted device 4 can also establish communication connections with the cloud server 5 using wireless communication method.

The wireless communication method may be any type of traditional wireless communication technology, such as radio, wireless fidelity (WIFI), cellular, satellite, broadcasting, etc. Wireless communication technologies may include, but are not limited to, Global System for Mobile Communications (GSM), General Packet Radio Service (GPRS), Code Division Multiple Access (CDMA), Wideband Code Division Multiple Access (W-CDMA), CDMA2000, IMT Single Carrier (IMT Single Carrier), Enhanced Data Rates for GSM Evolution (EDGE), Long-Term Evolution (LTE), Advanced Long-Term Evolution technology, Time-Division LTE (TD-LTE), High Performance Radio Local Area Network (HiperLAN), High Performance Radio Wide Area Network (HiperWAN), Local Multipoint Distribution Service (LMDS), Worldwide Interoperability for Microwave Access (WiMAX), ZIGBEE protocol (ZIGBEE), BLUETOOTH, Orthogonal Frequency Division Multiplexing (Flash Orthogonal) Frequency-Division Multiplexing, Flash-OFDM), High Capacity Spatial Division Multiple Access (HC-SDMA), Universal Mobile Telecommunications System (UMTS), Universal Mobile Telecommunications System, Time Division Dual Industrial (UMTS Time-Division Duplexing, UMTS-TDD), Evolved High Speed Packet Access (HSPA+), Time Division Synchronous Code Division Multiple Access (TD-SCDMA), evolution Data optimization (Evolution-Data Optimized, EV-DO), Digital Enhanced Cordless Telecommunications (DECT) and others.

In this embodiment, the mobile terminal 3 may be a mobile phone, a tablet computer or other terminal equipment. The vehicle-mounted device 4 may be a computer installed in a vehicle.

In other embodiments, the navigation system does not include the cloud server 5.

Figure 2:
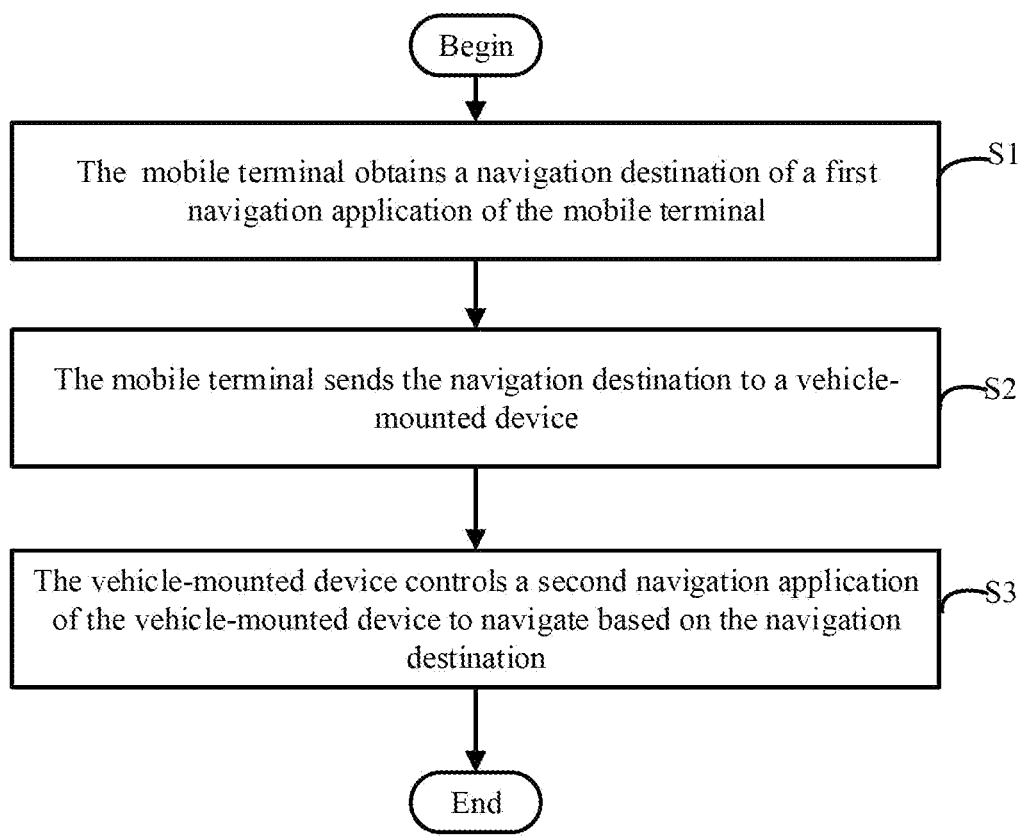
FIG. 2 shows a flow chart of one embodiment of a first navigation method of the present disclosure.

FIG. 2 shows a flowchart of a first navigation method using the navigation system shown in FIG. 1 according to a preferred embodiment of the present disclosure.

As shown in FIG. 2, the first navigation method includes the following blocks. According to different requirements, the order of the blocks in the flowchart can be changed, and some blocks can be omitted.

It should be noted that the first navigation method can be used when the user first uses a navigation application of the mobile terminal 3 to navigate to a destination (hereinafter "navigation destination"), and then use a navigation application of the vehicle-mounted device 4 to navigate to the navigation destination. For example, when a user makes a driving plan for visiting a place, the user may first open the navigation application of the mobile terminal 3 and set the place as the navigation destination. When the user gets in the vehicle, the user uses the navigation application of the vehicle-mounted device 4 to navigate to the place, i.e., the navigation destination.

At block S1, the mobile terminal 3 obtains a navigation destination of a navigation application of the mobile terminal 3 (for simply and clearly describing the present disclosure, the navigation application of the mobile terminal 3 is hereinafter referred to as "first navigation application").

In one embodiment, the first navigation application may be any application that can be used to provide navigation services, for example, it may be Gaode map, Baidu map, etc.

In an embodiment, the obtaining the navigation destination of the first navigation application of the mobile terminal 3 includes:

detecting a trigger event from a navigation button of the first navigation application; and searching for address content from an active window of the mobile terminal when the trigger event from the navigation button is detected, and setting the address content as the navigation destination.

In one embodiment, a trigger mode of triggering the trigger event can include, but is not limited to, click, touch, and sound.

It should be noted that the navigation button is a function button of the first navigation application. When the trigger event from the function button is detected, the mobile terminal 3 controls the first navigation application to perform a navigation function based on the navigation destination.

In one embodiment, the address content includes an address name, latitudes and longitudes corresponding to the address name.

In one embodiment, the mobile terminal 3 can monitor whether the navigation button of the first navigation application receives the trigger event by invoking an accessibility service provided by an operation system such as ANDROID system of the mobile terminal 3, and search for the address content from the active window of the mobile terminal 3.

In one embodiment, the mobile terminal 3 controls the first navigation application to perform navigation in a walking navigation mode or a driving navigation mode based on the navigation destination.

It should be noted that the walking navigation mode refers to navigating according to a route suitable for walking. The driving navigation mode refers to navigating according to a route suitable for driving.

At block S2, the mobile terminal 3 sends the navigation destination to the vehicle-mounted device 4.

In an embodiment, the mobile terminal 3 may send the navigation destination to the vehicle-mounted device 4 through wireless transmission.

In other embodiments, the mobile terminal 3 may first send the navigation destination to the cloud server 5 through wireless transmission, and then the cloud server 5 forwards the navigation destination to the vehicle-mounted device 4.

In other embodiments, the mobile terminal 3 may directly send the navigation destination to the vehicle-mounted device 4 via BLUETOOTH.

In one embodiment, when a distance between the mobile terminal 3 and the vehicle-mounted device 4 is less than a preset value (for example, 2 meters, or 5 meters), the mobile terminal 3 sends the navigation destination to the vehicle-mounted device 4.

Specifically, the mobile terminal 3 can use a first positioning device of the mobile terminal 3 to locate a real-time position of the mobile terminal 3, and detect the distance between the mobile terminal 3 and the vehicle-mounted device 4 in real time according to the real-time position of the mobile terminal 3 and a preset position of the vehicle-mounted device 4.

In one embodiment, when the mobile terminal 3 controls the first navigation application to perform navigation in the walking navigation mode based on the navigation destination, and the distance between the mobile terminal 3 and the vehicle-mounted device 4 is less than a predetermined distance (for example, 1 meter or 2 meters), the mobile terminal 3 controls the first navigation application to switch from the walking navigation mode to the driving navigation mode.

In one embodiment, the vehicle-mounted device 4 also monitors whether the user is close to the vehicle, and when it is determined that the user is close to the vehicle, the vehicle-mounted device 4 activates designated function. The activating the designated functions include, but are not limited to, turning on an air-conditioning of the vehicle and opening windows of the vehicle, so as to dissipate heat inside the vehicle and ventilate the vehicle.

In an embodiment, the vehicle-mounted device 4 can monitor whether the user is close to the vehicle according to sensing data of a sensor in a vehicle key of the vehicle.

In other embodiments, the vehicle-mounted device 4 may use an external camera to capture an image of the user, and detect whether the user is close to the vehicle based on the captured image.

Specifically, in one embodiment, the vehicle-mounted device 4 may first determine whether the user is an owner of the vehicle according to the captured image. When the vehicle-mounted device 4 determines that the user is the owner of the vehicle, the vehicle-mounted device 4 continues to determine whether the owner of vehicle is close to the vehicle according to a determination as to whether a proportion of a human face in the captured image occupying the captured image is greater than a preset proportion (for example, 60%, 80% or other value). For example, when the human face of the owner of the vehicle in the captured image occupies more than 60% of the captured image, the vehicle-mounted device 4 determines that the owner of the vehicle is close to the vehicle.

At block S3, when the vehicle-mounted device 4 receives the navigation destination, the vehicle-mounted device 4 controls a navigation application of the vehicle-mounted device 4 (for clearly and simply describing the present disclosure, the navigation application of the vehicle-mounted device 4 is hereinafter referred to as "second navigation application") to navigate based on the navigation destination.

In one embodiment, the controlling the second navigation application of the vehicle-mounted device 4 to navigate based on the navigation destination includes:

displaying a pop-up window on a display of the vehicle-mounted device 4 to prompt the user whether to navigate according to the navigation destination when the vehicle-mounted device 4 receives the navigation destination; and controlling the second navigation application to navigate based on the navigation destination when a confirmation signal is received from the pop-up window.

Figure 3:
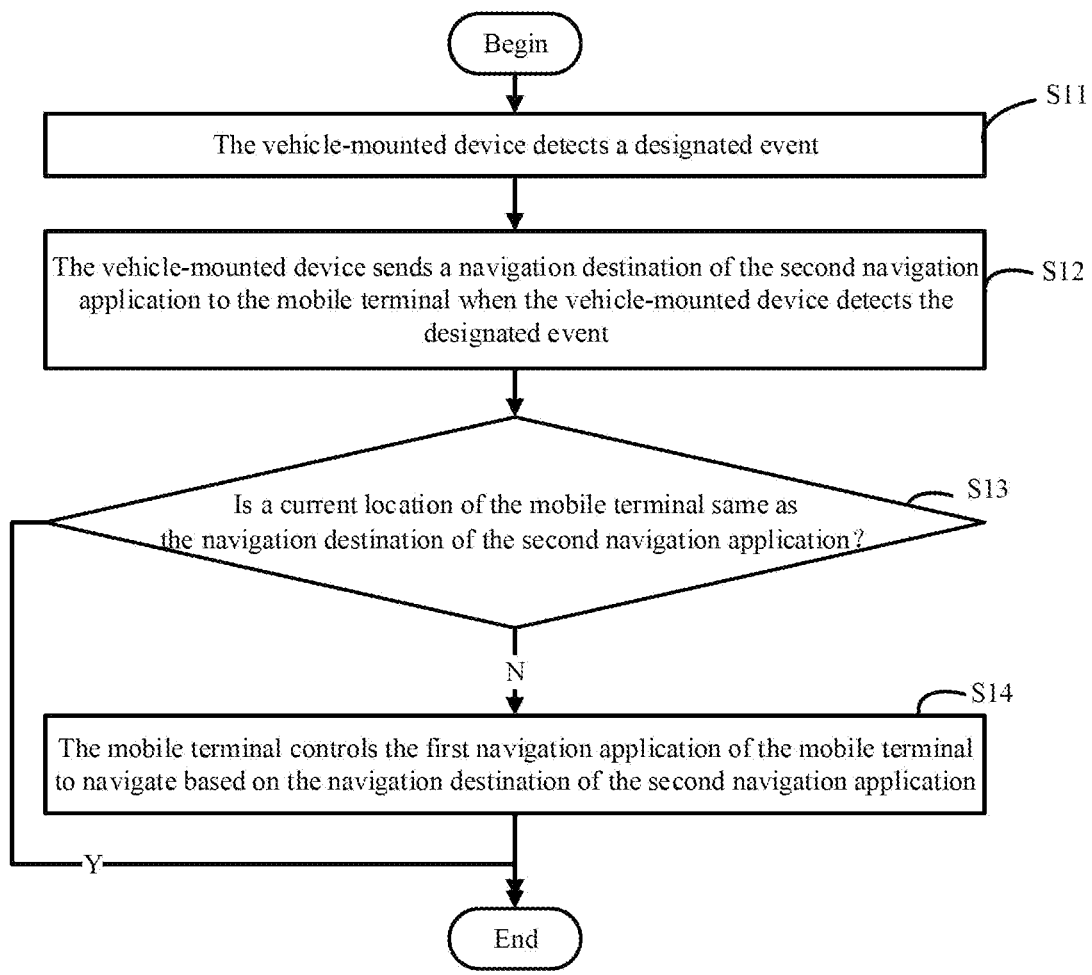
FIG. 3 shows a flow chart of one embodiment of a second navigation method of the present disclosure.

FIG. 3 shows a flowchart of a second navigation method using the navigation system shown in FIG. 1 according to a preferred embodiment of the present disclosure.

As shown in FIG. 3, the second navigation method includes the following blocks. According to different requirements, the order of the blocks in the flowchart can be changed, and some blocks can be omitted.

It should be noted that the second navigation method can be used when the vehicle has not arrived at the navigation destination, but the user gets off the vehicle and begins to use the first navigation application of the mobile terminal 3 to navigate to the navigation destination.

At block S11, the vehicle-mounted device 4 detects a designated event.

In one embodiment, the designated event refers to a user account being logged out of the second navigation application of the vehicle-mounted device 4; and/or a current location of the vehicle-mounted device 4 being different from the navigation destination of the second navigation application.

In an embodiment, the vehicle-mounted device 4 may use a second positioning device to obtain the current location of the vehicle-mounted device 4.

In one embodiment, the vehicle-mounted device 4 can detect the designated event in real time.

At block S12, the vehicle-mounted device 4 sends a navigation destination of the second navigation application to the mobile terminal 3 when the vehicle-mounted device 4 detects the designated event.

In an embodiment, the sending the navigation destination of the second navigation application to the mobile terminal 3 includes: sending the navigation destination of the second navigation application to the mobile terminal 3 by wireless transmission.

In an embodiment, the vehicle-mounted device 4 may first send the navigation destination of the second navigation application to the cloud server 5 through wireless transmission, and then the cloud server 5 forwards the navigation destination of the second navigation application to the mobile terminal 3.

In other embodiments, the vehicle-mounted device 4 can directly send the navigation destination of the second navigation application to the mobile terminal 3 via BLUETOOTH.

At block S13, the mobile terminal 3 receives the navigation destination of the second navigation application, and determines whether a current location of the mobile terminal 3 is the same as the navigation destination of the second navigation application.

When the current location of the mobile terminal 3 is different from the navigation destination of the second navigation application, the process goes to block S14. When the current location of the mobile terminal 3 is the same as the navigation destination of the second navigation application, the process ends.

Specifically, the mobile terminal 3 may use the first positioning device to obtain the current position of the mobile terminal 3. In this way, the mobile terminal 3 may compare the current location of the mobile terminal 3 with the navigation destination of the second navigation application to determine whether the current location of the mobile terminal 3 is the same as the navigation destination of the second navigation application.

At block S14, when the current location of the mobile terminal 3 is different from the navigation destination of the second navigation application, the mobile terminal 3 controls the first navigation application of the mobile terminal 3 to navigate based on the navigation destination of the second navigation application.

In an embodiment, the controlling the first navigation application of the mobile terminal 3 to navigate based on the navigation destination of the second navigation application includes:

calculating a distance between the current location of the mobile terminal 3 and the navigation destination of the second navigation application when the current location of the mobile terminal 3 is different from the navigation destination of the second navigation application;

controlling the first navigation application of the mobile terminal 3 to navigate based on the navigation destination of the second navigation application in a walking navigation mode when the distance is less than a preset value; and controlling the first navigation application of the mobile terminal 3 to navigate based on the navigation destination of the second navigation application in a smart navigation mode when the distance is greater than or equal to the preset value.

As mentioned above, the walking navigation mode refers to navigating according to a route suitable for walking. In one embodiment, the smart navigation mode refers to a combination of a navigation mode of riding bicycle, a navigation mode of taking bus, and/or the walking navigation mode.

In other embodiments, the controlling the first navigation application of the mobile terminal 3 to navigate based on the navigation destination of the second navigation application includes:

displaying a pop-up window on a display of the mobile terminal 3 to prompt the user whether or not to navigate based on the navigation destination of the second navigation application, when the current location of the mobile terminal 3 is different from the navigation destination of the second navigation application; and controlling the first navigation application to navigate based on the navigation destination of the second navigation application, when a confirmation signal is received from the pop-up window.

In other embodiments, the controlling the first navigation application of the mobile terminal 3 to navigate based on the navigation destination of the second navigation application includes:

displaying a pop-up window on the display of the mobile terminal 3 to prompt the user whether or not to navigate based on the navigation destination of the second navigation application, when the current location of the mobile terminal 3 is different from the navigation destination of the second navigation application;

calculating a distance between the current location of the mobile terminal 3 and the navigation destination of the second navigation application, when a confirmation signal is received from the pop-up window;

controlling the first navigation application of the mobile terminal 3 to navigate based on the navigation destination of the second navigation application in a walking navigation mode, when the distance is less than a preset value; and controlling the first navigation application of the mobile terminal 3 to navigate based on the navigation destination of the second navigation application in the smart navigation mode, when the distance is greater than or equal to the preset value.

As can be seen from the above blocks, we can see that when either the first or the second navigation method is used, the user does not need to input again the navigation destination, such that using the first or the second navigation application with ease.

Figure 4:
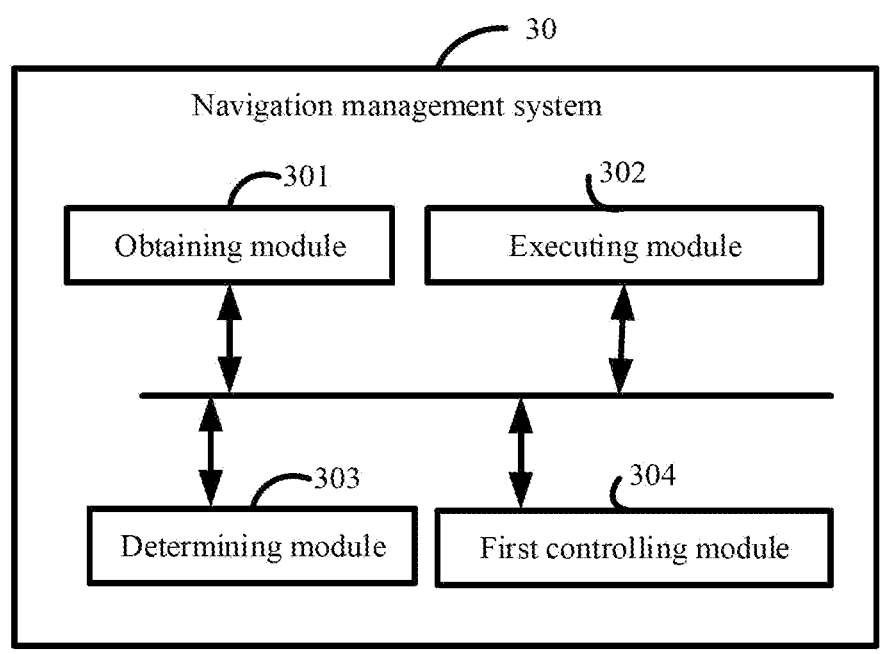
FIG. 4 shows a first embodiment of modules of a navigation management system of the present disclosure.

FIG. 4 shows a schematic block diagram of an embodiment of modules of a navigation management system 30 of the present disclosure.

In some embodiments, the navigation management system 30 runs in a mobile terminal. The navigation management system 30 may include a plurality of modules. The plurality of modules can comprise computerized instructions in a form of one or more computer-readable programs that can be stored in a non-transitory computer-readable medium (e.g., a storage device 31 of the mobile terminal 3 in FIG. 6), and executed by at least one processor (e.g., a processor 32 in FIG. 6) of the mobile terminal to implement navigation management function (described in detail in FIG. 2).

In at least one embodiment, the navigation management system 30 may include a plurality of modules. The plurality of modules may include, but is not limited to, an obtaining module 301, an executing module 302, a determining module 303, and a first controlling module 304. The modules 301-304 can comprise computerized instructions in the form of one or more computer-readable programs that can be stored in the non-transitory computer-readable medium (e.g., the storage device 31 of the mobile terminal 3), and executed by the at least one processor (e.g., a processor 32 in FIG. 6) of the mobile terminal to implement navigation management function (e.g., described in detail in FIG. 2).

Figure 5:
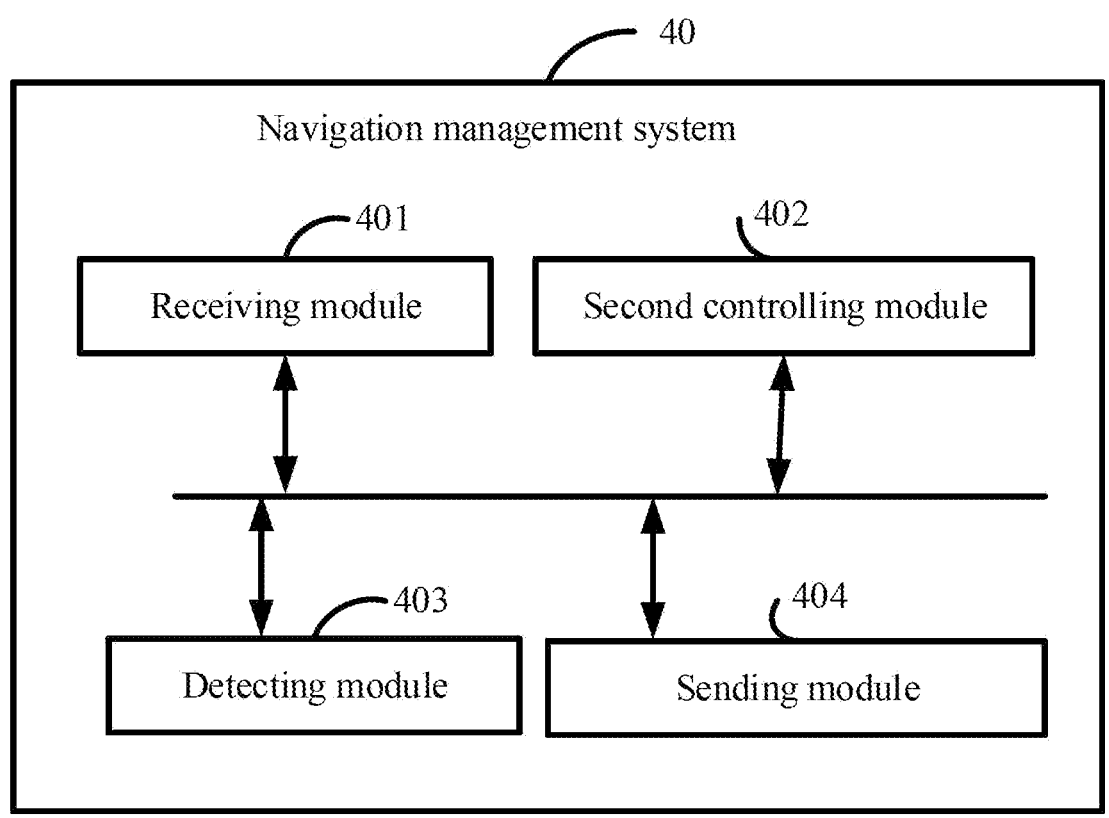
FIG. 5 shows a second embodiment of modules of a navigation management system of the present disclosure.

FIG. 5 shows a schematic block diagram of an embodiment of modules of a navigation management system 40 of the present disclosure.

Figure 7:
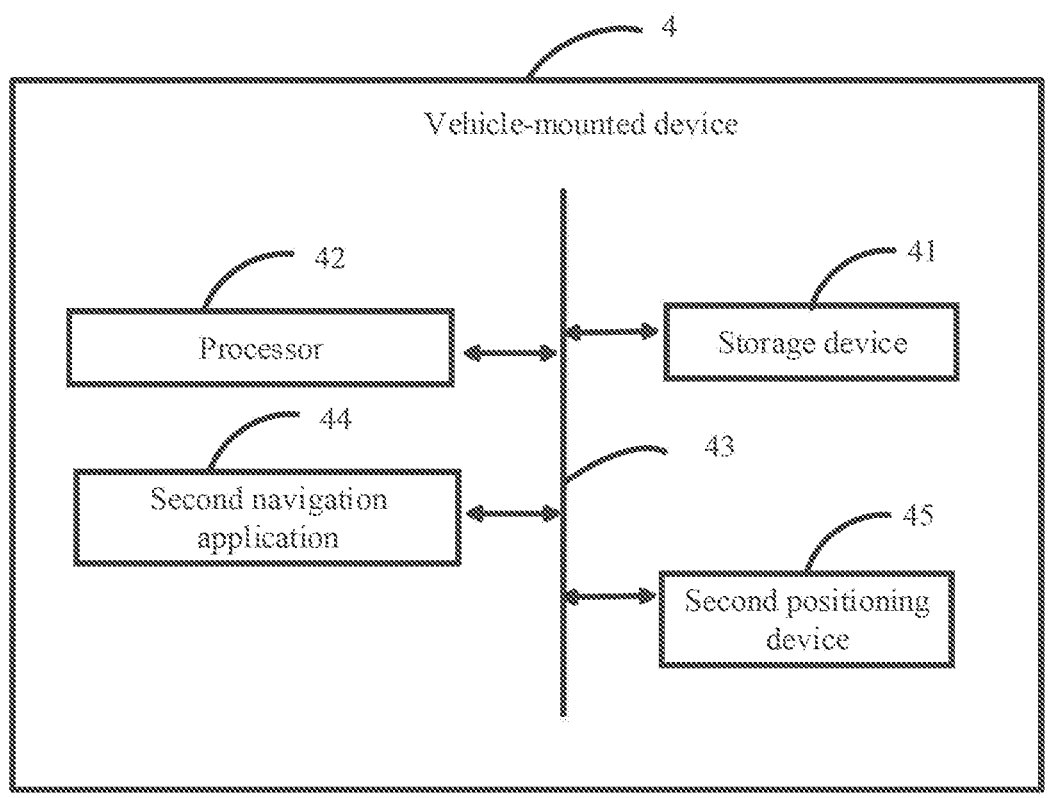
FIG. 7 illustrates a block diagram of one embodiment of a vehicle-mounted device.

In some embodiments, the navigation management system 40 runs in a vehicle-mounted device (e.g., a vehicle-mounted device in FIG. 7). The navigation management system 40 may include a plurality of modules. The plurality of modules can comprise computerized instructions in a form of one or more computer-readable programs that can be stored in a non-transitory computer-readable medium (e.g., a storage device 41 of the vehicle-mounted device 4 in FIG. 7), and executed by at least one processor (e.g., a processor 42 in FIG. 7) of the vehicle-mounted device to implement navigation management function (described in detail in FIG. 3).

In at least one embodiment, the navigation management system 40 may include a plurality of modules. The plurality of modules may include, but is not limited to, a receiving module 401, a second controlling module 402, a detecting module 403, and a sending module 404. The modules 401-404 can comprise computerized instructions in the form of one or more computer-readable programs that can be stored in the non-transitory computer-readable medium (e.g., the storage device 41 of the vehicle-mounted device 4), and executed by the at least one processor (e.g., a processor 42 in FIG. 7) of the vehicle-mounted device to implement navigation management function (e.g., described in detail in FIG. 3).

The functions of modules of the navigation management system 30 and 40 are described in the following.

The obtaining module 301 of the mobile terminal 3 obtains a navigation destination of a first navigation application of the mobile terminal 3.

In one embodiment, the first navigation application may be any application that can be used to provide navigation services, for example, it may be Gaode map, Baidu map, etc.

In an embodiment, the obtaining the navigation destination of the first navigation application of the mobile terminal 3 includes:

detecting a trigger event from a navigation button of the first navigation application; and searching for address content from an active window of the mobile terminal when the trigger event from the navigation button is detected, and setting the address content as the navigation destination of the first navigation application.

In one embodiment, a trigger mode of triggering the trigger event can include, but is not limited to, click, touch, and sound.

It should be noted that the navigation button is a function button of the first navigation application. When the trigger event from the function button is detected, the executing module 302 of the mobile terminal 3 controls the first navigation application to perform a navigation function based on the navigation destination of the first navigation application.

In one embodiment, the address content includes an address name, latitudes and longitudes corresponding to the address name.

In one embodiment, the obtaining module 301 of the mobile terminal 3 can monitor whether the navigation button of the first navigation application receives the trigger event by invoking an accessibility service provided by an operation system such as Android system of the mobile terminal 3, and search for the address content from the active window of the mobile terminal 3.

In one embodiment, the executing module 302 of the mobile terminal 3 controls the first navigation application to perform navigation in a walking navigation mode or a driving navigation mode based on the navigation destination of the first navigation application.

It should be noted that the walking navigation mode refers to navigating according to a route suitable for walking. The driving navigation mode refers to navigating according to a route suitable for driving.

The executing module 302 of the mobile terminal 3 sends the navigation destination of the first navigation application to the vehicle-mounted device 4.

In an embodiment, the executing module 302 of the mobile terminal 3 may send the navigation destination of the first navigation application to the vehicle-mounted device 4 through wireless transmission.

In other embodiments, the executing module 302 of the mobile terminal 3 may first send the navigation destination of the first navigation application to the cloud server 5 through wireless transmission, and then the cloud server 5 forwards the navigation destination of the first navigation application to the vehicle-mounted device 4.

In other embodiments, the executing module 302 of the mobile terminal 3 may directly send the navigation destination of the first navigation application to the vehicle-mounted device 4 via BLUETOOTH.

In one embodiment, when a distance between the mobile terminal 3 and the vehicle-mounted device 4 is less than a preset value (for example, 2 meters, or 5 meters), the executing module 302 of the mobile terminal 3 sends the navigation destination of the first navigation application to the vehicle-mounted device 4.

Specifically, the executing module 302 of the mobile terminal 3 can use a first positioning device of the mobile terminal 3 to locate a real-time position of the mobile terminal 3, and detect the distance between the mobile terminal 3 and the vehicle-mounted device 4 in real time according to the real-time position of the mobile terminal 3 and a preset position of the vehicle-mounted device 4.

In one embodiment, when the executing module 302 of the mobile terminal 3 controls the first navigation application to perform navigation in the walking navigation mode based on the navigation destination, and the distance between the mobile terminal 3 and the vehicle-mounted device 4 is less than a predetermined distance (for example, 1 meter or 2 meters), the executing module 302 of the mobile terminal 3 controls the first navigation application to switch from the walking navigation mode to the driving navigation mode.

In one embodiment, the second controlling module 402 of the vehicle-mounted device 4 monitors whether the user is close to the vehicle, and when it is determined that the user is close to the vehicle, the second controlling module 402 of the vehicle-mounted device 4 activates designated function. The activating designated functions include, but are not limited to, turning on an air-conditioning and opening windows of the vehicle, so as to dissipate heat inside the vehicle and ventilate the vehicle.

In an embodiment, the second controlling module 402 of the vehicle-mounted device 4 can monitor whether the user is close to the vehicle according to sensing data of a sensor in a vehicle key of the vehicle.

In other embodiments, the second controlling module 402 of the vehicle-mounted device 4 may use an external camera to capture an image of the user, and detect whether the user is close to the vehicle based on the captured image.

Specifically, in one embodiment, the second controlling module 402 of the vehicle-mounted device 4 may first determine whether the user is an owner of the vehicle according to the captured image. When the second controlling module 402 of the vehicle-mounted device 4 determines that the user is the owner of the vehicle, the second controlling module 402 of the vehicle-mounted device 4 continues to determine whether the owner of vehicle is close to the vehicle according to a determining result of whether a proportion of a human face in the captured image occupying the captured image is greater than a preset proportion (for example, 60%, 80% or other value). For example, when the human face of the owner of the vehicle in the captured image occupies more than 60% of the captured image, the second controlling module 402 of the vehicle-mounted device 4 determines the owner of the vehicle is close to the vehicle.

The receiving module 401 of the vehicle-mounted device 4 receives the navigation destination of the first navigation application, the second controlling module 402 of the vehicle-mounted device 4 controls the second navigation application of the vehicle-mounted device 4 to navigate based on the navigation destination of the first navigation application.

In one embodiment, the controlling the second navigation application of the vehicle-mounted device 4 to navigate based on the navigation destination of the first navigation application includes:

displaying a pop-up window on a display of the vehicle-mounted device 4 to prompt the user whether to navigate according to the navigation destination of the first navigation application when the vehicle-mounted device 4 receives the navigation destination of the first navigation application; and controlling the second navigation application to navigate based on the navigation destination of the first navigation application when a confirmation signal is received from the pop-up window.

The following further describes the functions of modules of the navigation management systems 30 and 40. It is assumed that vehicle have not arrived at the navigation destination of the first navigation application, but the user gets off the vehicle and begin to use the first navigation application of the mobile terminal 3 to navigate to the navigation destination of the first navigation application.

The detecting module 403 of the vehicle-mounted device 4 detects a designated event.

In one embodiment, the designated event refers to a user account being logged out of the second navigation application of the vehicle-mounted device 4; and/or a current location of the vehicle-mounted device 4 and a navigation destination of the second navigation application are different.

In an embodiment, the detecting module 403 of the vehicle-mounted device 4 may use a second positioning device to obtain the current location of the vehicle-mounted device 4.

In one embodiment, the detecting module 403 of the vehicle-mounted device 4 can detect the designated event in real time.

The sending module 404 of the vehicle-mounted device 4 sends the navigation destination of the second navigation application to the mobile terminal 3 when the detecting module 403 of the vehicle-mounted device 4 detects the designated event.

In an embodiment, the sending the navigation destination of the second navigation application to the mobile terminal 3 includes: sending the navigation destination of the second navigation application to the mobile terminal 3 by wireless transmission.

In an embodiment, the sending module 404 of the vehicle-mounted device 4 may first send the navigation destination of the second navigation application to the cloud server 5 through wireless transmission, and then the cloud server 5 forwards the navigation destination of the second navigation application to the mobile terminal 3.

In other embodiments, the sending module 404 of the vehicle-mounted device 4 can directly send the navigation destination of the second navigation application to the mobile terminal 3 via BLUETOOTH.

The determining module 303 of the mobile terminal 3 receives the navigation destination of the second navigation application, and determines whether a current location of the mobile terminal 3 is the same as the navigation destination of the second navigation application.

Specifically, the determining module 303 of the mobile terminal 3 may use a first positioning device to obtain the current position of the mobile terminal 3. In this way, the determining module 303 of the mobile terminal 3 may compare the current location of the mobile terminal 3 with the navigation destination of the second navigation application to determine whether the current location of the mobile terminal 3 is the same as the navigation destination of the second navigation application.

When the current location of the mobile terminal 3 is different from the navigation destination of the second navigation application, the first controlling module 304 of the mobile terminal 3 controls the first navigation application of the mobile terminal 3 to navigate based on the navigation destination of the second navigation application.

In an embodiment, the controlling the first navigation application of the mobile terminal 3 to navigate based on the navigation destination of the second navigation application includes:

calculating a distance between the current location of the mobile terminal 3 and the navigation destination of the second navigation application when the current location of the mobile terminal 3 is different from the navigation destination of the second navigation application;

controlling the first navigation application of the mobile terminal 3 to navigate based on the navigation destination of the second navigation application in a walking navigation mode when the distance is less than a preset value; and controlling the first navigation application of the mobile terminal 3 to navigate based on the navigation destination of the second navigation application in a smart navigation mode when the distance is greater than or equal to the preset value.

As mentioned above, the walking navigation mode refers to navigating according to a route suitable for walking. In one embodiment, the smart navigation mode refers to a combination of a navigation mode of riding bicycle, a navigation mode of taking bus, and/or the walking navigation mode.

In other embodiments, the controlling the first navigation application of the mobile terminal 3 to navigate based on the navigation destination of the second navigation application includes:

displaying a pop-up window on a display of the mobile terminal 3 to prompt the user whether or not to navigate based on the navigation destination of the second navigation application, when the current location of the mobile terminal 3 is different from the navigation destination of the second navigation application; and controlling the first navigation application to navigate based on the navigation destination of the second navigation application, when a confirmation signal is received from the pop-up window.

In other embodiments, the controlling the first navigation application of the mobile terminal 3 to navigate based on the navigation destination of the second navigation application includes:

displaying a pop-up window on the display of the mobile terminal 3 to prompt the user whether or not to navigate based on the navigation destination of the second navigation application, when the current location of the mobile terminal 3 is different from the navigation destination of the second navigation application;

calculating a distance between the current location of the mobile terminal 3 and the navigation destination of the second navigation application, when a confirmation signal is received from the pop-up window;

controlling the first navigation application of the mobile terminal 3 to navigate based on the navigation destination of the second navigation application in a walking navigation mode, when the distance is less than a preset value; and controlling the first navigation application of the mobile terminal 3 to navigate based on the navigation destination of the second navigation application in the smart navigation mode, when the distance is greater than or equal to the preset value.

Figure 6:
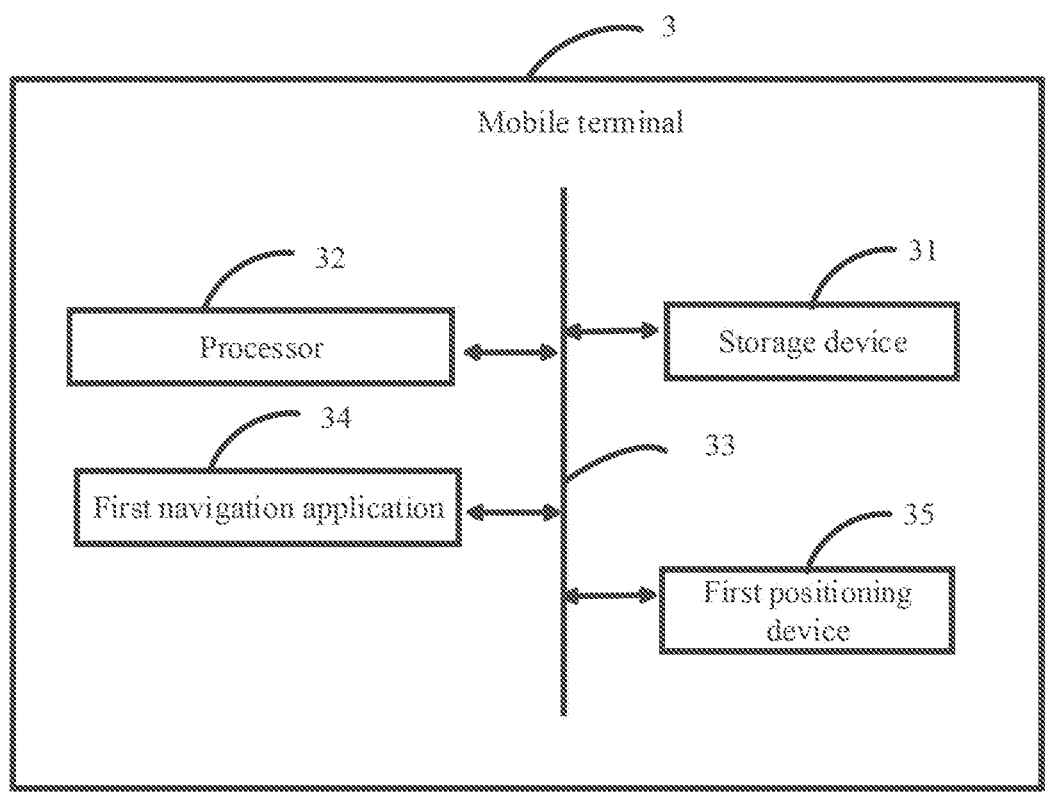
FIG. 6 illustrates a block diagram of one embodiment of a mobile terminal.

FIG. 6 shows a schematic block diagram of one embodiment of a mobile terminal 3. The mobile terminal 3 may include, but is not limited to, a storage device 31, at least one processor 32, at least one communication bus 33, a first navigation application 34, and a first positioning device 35.

It should be understood by those skilled in the art that the structure of the mobile terminal 3 shown in FIG. 6 does not constitute a limitation of the embodiment of the present disclosure. The mobile terminal 3 may further include other hardware or software, or the mobile terminal 3 may have different component arrangements. For example, the mobile terminal 3 can further including a display device.

The mobile terminal 3 can be a mobile phone, a tablet computer, or other suitable terminal device.

In at least one embodiment, the mobile terminal 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the mobile terminal 3 is merely an example, and other existing or future electronic products may be included in the scope of the present disclosure, and are included in the reference.

In some embodiments, the storage device 31 can be used to store program codes of computer readable programs and various data, such as the navigation management system 30 installed in the mobile terminal 3, and automatically access to the programs or data with high speed during the running of the mobile terminal 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the mobile terminal 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the mobile terminal 3, which connects various components of the mobile terminal 3 using various interfaces and lines. By running or executing a computer program or modules stored in the storage device 31, and by invoking the data stored in the storage device 31, the at least one processor 32 can perform various functions of the mobile terminal 3 and process data of the mobile terminal 3. For example, the function of performing the navigation management.

Although not shown, the mobile terminal 3 may further include a power supply (such as a battery) for powering various components. Preferably, the power supply may be logically connected to the at least one processor 32 through a power management device, thereby, the power management device manages functions such as charging, discharging, and power management. The power supply may include one or more a DC or AC power source, a recharging device, a power failure detection circuit, a power converter or inverter, a power status indicator, and the like. The mobile terminal 3 may further include various sensing modules, such as a BLUETOOTH module, a Wi-Fi module, and the like, and details are not described herein.

In at least one embodiment, as shown in FIG. 4, the at least one processor 32 can execute various types of applications (such as the navigation management system 30) installed in the mobile terminal 3, program codes, and the like. For example, the at least one processor 32 can execute the modules 301-304 of the navigation management system 30.

In at least one embodiment, the storage device 31 stores program codes. The at least one processor 32 can invoke the program codes stored in the storage device to perform functions. For example, the modules described in FIG. 4 are program codes stored in the storage device 31 and executed by the at least one processor 32, to implement the functions of the various modules for the purpose of realizing the navigation management as described in FIG. 2.

In at least one embodiment, the storage device 31 stores one or more instructions (i.e., at least one instruction) that are executed by the at least one processor 32 to achieve the purpose of realizing the navigation management as described in FIG. 2.

In at least one embodiment, the at least one processor 32 can execute the at least one instruction stored in the storage device 31 to perform the operations of as shown in FIG. 2.

FIG. 7 shows a schematic block diagram of one embodiment of a vehicle-mounted device 4. The vehicle-mounted device 4 may include, but is not limited to, a storage device 41, at least one processor 42, at least one communication bus 43, a second navigation application 44, and a second positioning device 45.

It should be understood by those skilled in the art that the structure of the vehicle-mounted device 4 shown in FIG. 7 does not constitute a limitation of the embodiment of the present disclosure. The vehicle-mounted device 4 may further include other hardware or software, or the vehicle-mounted device 4 may have different component arrangements. For example, the vehicle-mounted device 4 can further including a display device.

The vehicle-mounted device 4 can be a vehicle-mounted computer that is installed in a vehicle.

In at least one embodiment, the vehicle-mounted device 4 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the vehicle-mounted device 4 is merely an example, and other existing or future electronic products may be included in the scope of the present disclosure, and are included in the reference.

In some embodiments, the storage device 41 can be used to store program codes of computer readable programs and various data, such as the navigation management system 40 installed in the vehicle-mounted device 4, and automatically access to the programs or data with high speed during the running of the vehicle-mounted device 4. The storage device 41 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the vehicle-mounted device 4 that can be used to carry or store data.

In some embodiments, the at least one processor 42 may be composed of an integrated circuit, for example, may be composed of a single packaged integrated circuit, or multiple integrated circuits of same function or different functions. The at least one processor 42 can include one or more central processing units (CPU), a microprocessor, a digital processing chip, a graphics processor, and various control chips. The at least one processor 42 is a control unit of the vehicle-mounted device 4, which connects various components of the vehicle-mounted device 4 using various interfaces and lines. By running or executing a computer program or modules stored in the storage device 41, and by invoking the data stored in the storage device 41, the at least one processor 42 can perform various functions of the vehicle-mounted device 4 and process data of the vehicle-mounted device 4. For example, the function of performing the navigation management.

Although not shown, the vehicle-mounted device 4 may further include a power supply (such as a battery) for powering various components. Preferably, the power supply may be logically connected to the at least one processor 42 through a power management device, thereby, the power management device manages functions such as charging, discharging, and power management. The power supply may include one or more a DC or AC power source, a recharging device, a power failure detection circuit, a power converter or inverter, a power status indicator, and the like. The vehicle-mounted device 4 may further include various sensing modules, such as a BLUETOOTH module, a Wi-Fi module, and the like, and details are not described herein.

In at least one embodiment, as shown in FIG. 5, the at least one processor 42 can execute various types of applications (such as the navigation management system 40) installed in the vehicle-mounted device 4, program codes, and the like. For example, the at least one processor 42 can execute the modules 401-404 of the navigation management system 40.

In at least one embodiment, the storage device 41 stores program codes. The at least one processor 42 can invoke the program codes stored in the storage device to perform functions. For example, the modules described in FIG. 5 are program codes stored in the storage device 41 and executed by the at least one processor 42, to implement the functions of the various modules for the purpose of realizing the navigation management as described in FIG. 3.

In at least one embodiment, the storage device 41 stores one or more instructions (i.e., at least one instruction) that are executed by the at least one processor 42 to achieve the purpose of realizing the navigation management as described in FIG. 3.

In at least one embodiment, the at least one processor 42 can execute the at least one instruction stored in the storage device 41 to perform the operations of as shown in FIG. 3.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A navigation method comprising:
obtaining a navigation destination of a first navigation application of a mobile terminal;
controlling the first navigation application of the mobile terminal to navigate in a walking navigation mode, based on the navigation destination;
after controlling the first navigation application to navigate in the walking navigation mode, sending the navigation destination of the first navigation application to a vehicle-mounted device;
controlling a second navigation application of the vehicle-mounted device to navigate in a driving navigation mode based on the navigation destination of the first navigation application,
sending, by the vehicle-mounted device, a navigation destination of the second navigation application to the mobile terminal, when the vehicle-mounted device meets preset conditions;
determining, by the mobile terminal, whether a current location of the mobile terminal is same as the navigation destination of the second navigation application, when the navigation destination of the second navigation application is received; and
controlling, by the mobile terminal, the first navigation application of the mobile terminal to navigate based on the navigation destination of the second navigation application, when the current location of the mobile terminal is different from the navigation destination of the second navigation application,
wherein the preset conditions comprise: a first condition that a user account being logged out of the second navigation application of the vehicle-mounted device;

and a second condition that a current location of the vehicle-mounted device and the navigation destination of the second navigation application are different.

2. A navigation method comprising:
sending, from a vehicle-mounted device, a navigation destination of a second navigation application of the vehicle-mounted device to a mobile terminal, when the vehicle-mounted device meets preset conditions, wherein the preset conditions comprise: a first condition that a user account being logged out of the second navigation application of the vehicle-mounted device; and a second condition that a current location of the vehicle-mounted device and the navigation destination of the second navigation application are different;
determining, by the mobile terminal, whether a current location of the mobile terminal is same as the navigation destination of the second navigation application, when the navigation destination of the second navigation application is received by the mobile terminal; and
controlling, by the mobile terminal, a first navigation application of the mobile terminal to navigate based on the navigation destination of the second navigation application, when the current location of the mobile terminal is different from the navigation destination of the second navigation application.

3. The navigation method according to claim 2, wherein the controlling the first navigation application of the mobile terminal to navigate based on the navigation destination of the second navigation application comprises:
calculating a distance between the current location of the mobile terminal and the navigation destination of the second navigation application, when the current location of the mobile terminal is different from the navigation destination of the second navigation application;
controlling the first navigation application of the mobile terminal to navigate based on the navigation destination of the second navigation application in a walking navigation mode when the distance is less than a preset value; and
controlling the first navigation application of the mobile terminal to navigate based on the navigation destination of the second navigation application in a smart navigation mode when the distance is greater than or equal to the preset value.

4. The navigation method according to claim 2, wherein the controlling the first navigation application of the mobile terminal to navigate based on the navigation destination of the second navigation application comprises:
displaying a pop-up window on a display of the mobile terminal to prompt a user whether to navigate based on the navigation destination of the second navigation application, when the current location of the mobile terminal is different from the navigation destination of the second navigation application; and
controlling the first navigation application to navigate based on the navigation destination of the second navigation application, when a confirmation signal is received from the pop-up window.

5. The navigation method according to claim 2, wherein the controlling the first navigation application of the mobile terminal to navigate based on the navigation destination of the second navigation application comprises:
displaying a pop-up window on a display of the mobile terminal to prompt a user whether to navigate based on the navigation destination of the second navigation application, when the current location of the mobile terminal is different from the navigation destination of the second navigation application;
calculating a distance between the current location of the mobile terminal and the navigation destination of the second navigation application, when a confirmation signal is received from the pop-up window;
controlling the first navigation application of the mobile terminal to navigate based on the navigation destination of the second navigation application in a walking navigation mode, when the distance is less than a preset value; and
controlling the first navigation application of the mobile terminal to navigate based on the navigation destination of the second navigation application in a smart navigation mode, when the distance is greater than or equal to the preset value.

* * * * *